United States Patent [19]
Firey

[11] Patent Number: 5,899,188
[45] Date of Patent: May 4, 1999

[54] AIR FUEL VAPOR STRATIFIER

[76] Inventor: Joseph C. Firey, P.O. Box 15514, Seattle, Wash. 98115-0514

[21] Appl. No.: 08/986,608

[22] Filed: Dec. 8, 1997

[51] Int. Cl.⁶ .............................. F02B 17/00; F02M 59/30
[52] U.S. Cl. ......................... 123/250; 123/295; 123/430; 123/504
[58] Field of Search ..................................... 123/736, 250, 123/295, 294, 298, 305, 429, 430, 445, 495, 504, 531

[56] References Cited

U.S. PATENT DOCUMENTS

| | | | |
|---|---|---|---|
| 2,095,889 | 10/1937 | Pokorney | 123/250 |
| 5,119,779 | 6/1992 | Plohberger et al. | 123/250 |
| 5,785,015 | 7/1998 | Philippe et al. | 123/70 R |
| 5,813,379 | 9/1998 | Firey | 123/143 B |

OTHER PUBLICATIONS

"Fuel Injection and Controls For Internal Combustion Engines" by P. G. Burman and F. DeLuca, Simmons Boardman Publ., New York, 1962.

*Primary Examiner*—Tony M. Argenbright

[57] ABSTRACT

An air fuel vapor stratifier apparatus is described, for use with piston internal combustion engines, to create stratified air fuel vapor mixtures within the engine combustion chamber. A fuel rich air fuel vapor mixture is created within a separate chamber, and then displaced into the engine combustion chamber, where it mixes with air contained therein. The consequently leaner air fuel vapor mixture is spark ignited following mixing, and burning takes place. Very lean overall air fuel ratios can be used since a stratified mixture is created. Hence intake air throttling is unnecessary and thus engine efficiency is improved. The absence of liquid fuel during burning in the engine combustion chamber, largely prevents the formation of soot, and thus reduces undesirable exhaust smoke.

16 Claims, 4 Drawing Sheets

AIR FUEL VAPOR STRATIFIER

CROSS REFERENCES TO RELATED APPLICATIONS

The invention described herein is related to my following US Patent applications:
1. "Displacer Jet Igniter," Ser. No. 08/368,093, now U.S. Pat. No. 5,813,379;
2. "Multipulse Engine Stratifier and Igniter," Ser. No. 08/815,197, abandoned;
3. "Compression Ignition Engine Combustion Process," Ser. No. 08/838,720, abandoned;

BACKGROUND OF THE INVENTION

1. Field of the Invention

This invention is in the fields of air fuel mixture stratifiers and igniters for internal combustion engines of the piston and cylinder type, wherein a jet of air fuel mixture can be used to create a stratified principal air fuel mixture in the combustion chamber of the engine cylinder.

2. Description of the Prior Art

The Hesselman engine combustion process, and the more recent Texaco combustion process, are examples of early prior art air fuel mixture stratifiers, which created a stratified principal air fuel mixture in the engine combustion chamber. Descriptions of these prior art mixture stratifier schemes are presented in the following references:
  (i) "A High Power Spark-Ignition Fuel Injection Engine," Trans. SAE, Vol. 35, p.431, 1934;
  (ii) "The Elimination of Combustion Knock-Texaco Combustion Process," SAE Quarterly Trans., Vol. 5, p. 26, 1951;
  (iii) "The Elimination of Combustion Knock," E. Barber, J. Malin, J. Mikita, Jour. of the Franklin Institute, Vol. 241, p. 275, April 1946;

In these prior art combustion processes, a jet of liquid fuel was injected into the engine combustion chamber, near the end of the compression stroke. The air inside the engine cylinder was set into rotary motion during intake, by use of shrouded intake valves, or specially oriented intake ports and manifolds. The liquid fuel spray was carried by the rotating air into which it was injected, toward a spark igniter. When this stratified air fuel mixture reached the spark, evaporated portions of the fuel, diffused into the surrounding air, were ignited by the spark; and a burning zone was thus created. The heat generated in this burning zone, evaporated those fuel portions unevaporated at the time of spark ignition and subsequent interdiffusion of air and thusly evaporated fuel maintained the burning zone, until most of the injected liquid fuel was burned. This burning process somewhat resembles that of a conventional liquid fueled oil burner, except that it is carried out intermittently and at high pressure.

Since air fuel vapor mixture is burned very shortly after being created, time is not available for expiration of the compression ignition delay period, which leads to engine knock. Thus one principal advantage of the Texaco combustion process was that high engine compression ratio, and hence high engine efficiency, could be achieved while using fuels of low octane number, and hence low knock resistance. Such low octane number fuels are generally of lower cost than high octane number fuels.

Engine torque was adjusted, for this Texaco combustion process, by proportionally adjusting the liquid fuel quantity injected into the engine cylinder, using fuel injection pumps and nozzles very similar to diesel engine injection pumps and nozzles. Since a stratified mixture was used, the air quantity inside the engine cylinder did not require adjustment, and an intake manifold throttle valve was not used. In consequence, the engine efficiency losses due to intake air throttling were avoided. Hence another principal advantage of the Texaco combustion process, was that high engine efficiency could be obtained at low engine torque since the usual throttling was avoided.

Liquid fuel, unevaporated at the start of burning, becomes surrounded by very hot burned gases, essentially devoid of oxygen. Rapid evaporation of liquid followed, but in the absence of oxygen, this evaporated fuel produced a high yield of soot particles, in a manner similar to soot production in diesel engines. Appreciable portions of this soot survives to exhaust to create an undesirable exhaust soot emission.

The injected liquid fuel volume, being much smaller than the air volume needed for burning, it is difficult to distribute the liquid spray particles uniformly throughout the cylinder air mass. In consequence the available cylinder air mass is incompletely utilized for burning. For this reason a larger engine displacement is needed, resulting in increased engine weight and cost than for a comparable conventional gasoline engine.

The liquid fuel is injected at high pressure, and must withstand subsequent peak combustion pressures and high heat transfer rates which follow. The fuel injection equipment is thus essentially similar to that used with conventional diesel engines and is expensive.

These then are the principal disadvantages of the Texaco combustion process; that exhaust soot is emitted, that a larger engine displacement is needed, and that expensive fuel injection equipment is required. It would be desirable to have available an engine system capable of realizing the knock suppression and reduced friction loss characteristics of this Texaco combustion system, but possessing reduced soot emissions, better air utilization, and lower cost fuel injection apparatus.

3. Definitions

The term piston internal combustion engine is used herein and in the claims to mean an internal combustion engine of the piston and cylinder type, with connecting rod and crankshaft or equivalent, such as the Wankel engine type, and comprising:
  at least one combined means for compressing and expanding gases, each combined means comprising: an internal combustion engine mechanism comprising a variable volume chamber for compressing and expanding gases, and drive means, such as a connecting rod and crankshaft, for driving said internal combustion engine mechanism and varying the volume of said chamber through repeated cycles. Each variable volume chamber comprises a combustion chamber end at the minimum volume position of the variable volume.

Each variable volume cycle comprises a compression time interval, when said variable volume is sealed and decreasing, followed by an expansion time interval, when said variable volume is sealed and increasing, these two time intervals together being a compression and expansion time interval.

Each combined means for compressing and expanding further comprises intake means for admitting reactant gases into said variable volume chamber prior to each compression time interval and exhaust means for removing reacted gases from said variable volume chamber after each expansion time interval.

Each variable volume cycle further comprises an exhaust time interval, when said variable volume is opened to said exhaust means, followed by an intake time interval, when said variable volume is opened to said intake means, these two time intervals being an exhaust and intake time interval; said exhaust and intake time interval following after a preceding expansion time interval and preceding a next following compression time interval. For a four stroke cycle piston internal combustion engine each separate time interval occupies approximately one half engine revolution and thus one stroke of the piston. For a two stroke cycle piston internal combustion engine the expansion time interval together with the exhaust time interval occupy approximately a half engine revolution and one piston stroke, and an intake time interval followed by a compression time interval occupy the next following half engine revolution and piston stroke.

A piston internal combustion engine further comprises a source of supply of reactant gas containing appreciable oxygen gas to each said intake means for admitting reactant gases into said variable volume chamber.

The combustion time interval is that portion of the compression and expansion time interval when burning of the air fuel mixture in the engine cylinder is intended to take place. For reasons of engine efficiency this combustion time interval is usually to occur when the variable volume chamber is at or near to its minimum volume, during or following a compression time interval.

The term reactant gas containing appreciable oxygen gas is used herein and in the claims to mean a reactant gas containing at least as much oxygen as is contained in the atmosphere.

SUMMARY OF THE INVENTION

The air fuel vapor stratifiers of this invention can be used to create stratified air fuel mixtures within the combustion chamber of piston internal combustion engines of either two stroke type or four stroke type. A fuel rich air fuel vapor mixture is created within a separate displacer volume chamber. This rich air fuel vapor mixture is then displaced out of the displacer volume, and into the variable volume chamber at the combustion chamber end thereof, by a displacer piston, during the combustion time interval. Within the combustion chamber, the rich air fuel vapor mixture is mixed with the air in the variable volume chamber, to create a fuel leaner air fuel vapor mixture, which is then spark ignited to initiate combustion. Complete burning of the fuel leaner stratified air fuel vapor mixture then follows. The absence of any liquid fuel within the burning zone prevents the formation of any appreciable soot, and this is one of the beneficial objects of this invention.

The fuel rich air fuel vapor mixture can flow into the variable volume chamber via one or more separate flow passages. When several flow passages are used these can be positioned to place the several consequent burning zones throughout the variable volume chamber, in order to more fully utilize the air mass available in the variable volume chamber. This is another beneficial object of this invention, that the available air mass can be largely utilized for fuel burning at full power, and engine displacement, and hence size and cost, need not be increased to allow for incomplete air utilization.

To thusly create several separate burning zones, using a prior art stratified scheme, such as the Texaco combination process, would require several separate liquid fuel injectors, each of which is expensive. The air fuel vapor stratifier of this invention can create such several separate burning zones by using but a single fuel injector, since the fuel is injected into the displacer volume, rather than into the combustion chamber. This single fuel injector of this invention is not subject to a high rate of heat transfer since burning does not occur within the displacer volume. The single fuel injector of this invention can also operate at moderate injection pressure, since fuel can be injected into the displacer volume rather early during compression, when pressures are low. For these several reasons, the fuel injectors for this invention can be of low cost, and this is another beneficial object of this invention.

As with the prior art Texaco combustion process, the air quantity within the variable volume chamber need not be adjusted for varying torque, since a stratified mixture is used with the air fuel vapor stratifiers of this invention. Thus an intake air throttle is unnecessary, and the pumping work loss, due to throttling at part load, is avoided.

The air fuel vapor mixture within the displacer volume is maintained fuel rich by adjusting the displaced volume about proportionally to the fuel quantity. As a result, the compression ignition delay period thereof will be very long. Only after this rich air fuel vapor mixture is displaced into the variable volume chamber, and admixed with additional air, is a shorter compression ignition delay period encountered, and ignition and burning of the now fuel leaner mixture can take place well before expiration of this delay period. Hence the knock suppression advantages of the prior art Texaco combustion process are retained with the air fuel vapor stratifiers of this invention.

BRIEF DESCRIPTION OF THE DRAWINGS

A mechanically driven air fuel vapor stratifier of this invention is shown schematically on a two stroke cycle internal combustion engine in FIG. 1.

A mechanical and hydraulic driven air fuel vapor stratifier of this invention is shown schematically in FIG. 2.

A pneumatically driven air fuel vapor stratifier of this invention is shown schematically in FIG. 3.

Another form of pneumatically driven air fuel vapor stratifier of this invention is shown schematically in FIG. 4.

DESCRIPTION OF THE PREFERRED EMBODIMENTS

1. General Description and Benefits

The air fuel vapor stratifiers of this invention are for use as an improved means for creating a stratified fuel and air mixture in the variable volume chamber of a piston type internal combustion engine, as described hereinabove, at the preferred combustion time in the engine cycle. Each cylinder of an engine is fitted with at least one air fuel vapor stratifier and each air fuel vapor stratifier comprises the following elements:

a. A displacer comprising a displacer piston, sealably operative within a displacer cylinder, and these enclosing a displacer volume, within which an air fuel mixture can be created and contained;

b. One or more exit flow connections connect separately from the displacer volume into the combustion chamber portion of the variable volume chamber;

c. A driver and driver timer for driving the displacer piston into the displacer volume functions to displace the air fuel mixture out of the displacer volume, and into the variable volume chamber, during the combustion time interval, and via the exit flow passages. Preferably the driver holds the displacer piston inside the displacer volume throughout the expansion time interval to prevent hot burned gas backflow into the displacer volume;

d. A retractor and retractor timer retracts the displacer piston out of the displacer volume, during a portion of the exhaust intake and compression time intervals, which follow the expansion time interval. The displacer volume is then available to contain the air fuel vapor mixture for the next following engine cycle;

e. A mixture generator is used to create an air fuel vapor mixture within the displacer volume, prior to each combustion time interval. This air fuel vapor mixture can be created by injecting a fuel quantity from a source, into the displacer volume, while the displacer piston is retracting during the compression time interval. This retraction during compression supplies the air quantity from the variable volume chamber, via the open exit flow passages.

Alternatively the air fuel vapor mixture can be created in a separate mixer, apart from the displacer volume. Fuel is injected into this separate mixer, while atmospheric air is also flowing into the separate mixer, and on into the displacer volume, via an open air fuel mixture connection, during displacer piston retraction, the exit flow passages being closed during retraction.

To prevent backflow during the combustion time interval when the displacer piston is moving into the displacer volume, check valves, or similar flow controllers, are placed in the fuel supply line or the air fuel mixture connection. In this way the air fuel mixture, created inside the displaced volume, can only flow out of this volume, into the variable volume chamber, via the exit flow passages during the combustion time interval;

f. A displacer volume adjustor is used to adjust the displacer volume and hence the volume of the air fuel vapor mixture, while the engine is running. An engine fuel quantity adjustor is also used to adjust the fuel quantity per engine cycle in each air fuel mixture, created within the displacer volume, in order to adjust engine torque output;

g. In many engine applications, it will be preferred to adjust displacer volume in proportion to fuel quantity so that the air quantity in each air fuel mixture inside the displacer volume is proportional to the fuel quantity. In this way the air to fuel ratio of the mixture can be kept approximately constant within desired limits;

h. An air fuel vapor stratifier of this invention, as described above, will inject an air fuel mixture into the combustion chamber end of the engine variable volume chamber, during the combustion time interval. This injected air fuel mixture will then mix with, and interdiffuse with, the other gases such as air, in the variable volume chamber. To start the burning of this resulting stratified air fuel mixture in the variable volume chamber, various types of ignition can be utilized, alone or in combination, of which the following are examples:

(i) Spark electrodes at the combustion chamber end of the variable volume chamber can ignite those air fuel vapor mixture portions having an air fuel ratio within the spark ignitable limits for the fuel being used. These spark electrodes require a spark energizer and timer to create the spark during the combustion time interval. These spark electrodes are thus to be positioned where the adjacent stratified mixture is spark ignitable. This positioning depends upon the air fuel ratio of the displacer mixture, the gas flow pattern inside the variable volume chamber, the relative timing of the spark and the displacement of the displacer mixture into the variable volume chamber, and other factors. Hence proper spark electrode positioning is best determined experimentally for each particular engine design. Several separate spark electrodes can be used and all or some of these can operate with a continuous spark during the combustion time interval, in order to assure ignition and burning of the stratified air fuel mixture in the variable volume chamber. It will be preferable to prevent the spark ignited flame from moving back into the displacer volume, via the exit flow passages. This can be accomplished by placing flame arresters at the variable volume chamber end of the exit flow passages. Alternatively, and preferably in many applications, the displacer air fuel vapor mixture can be fuel richer than the rich spark ignition limit and the rich inflammability limit.

(ii) Glow plugs, with suitable energizers, can be used as igniters in place of spark igniters.

(iii) The stratified air fuel vapor mixture can be compression ignited by use of adequate engine compression ratio. Such compression ignition will occur initially in those portions of the stratified mixture having the shortest compression ignition time delay interval. This use of compression ignition is described in my earlier filed US Patent application entitled, "Compression Ignition Engine Combustion Process," Ser. No. 08/838720, and this material is incorporated herein by reference thereto. As described therein, when compression ignition is used, several separate exit flow passages will be preferred. To avoid compression ignition of the displacer air fuel vapor mixture, inside the displacer volume, very fuel rich displacer mixtures can be used therein whose compression ignition time delay is very long.

i. To achieve a modified combustion process, similar to the Texaco Combustion Process, but with reduced soot formation, and more complete utilization of the available engine air quantity, an air fuel vapor stratifier of this invention can be used with one or more spark igniters as follows:

(i) The air mass inside the variable volume chamber is set into rotation by use of shrouded intake valves or directional intake ports;

(ii) The air fuel vapor stratifier injects a rich air fuel mixture into the rotating air mass;

(iii) Mixing and interdiffusion between the rich injected mixture and the air mass creates spark ignitable portions, and these are ignited by the spark igniters;

(iv) Burning of the stratified air fuel mixture in the variable volume chamber takes place. The spark initiated flames progress into the mixture as interdiffusion continues to create mixture regions with inflammable air fuel ratios;

(v) Unburned mixture regions are air alone or richer than the inflammable limits and these mixtures cannot be compression ignited. As a result engine knock is prevented as in the Texaco Combustion Process.

Figure 1:
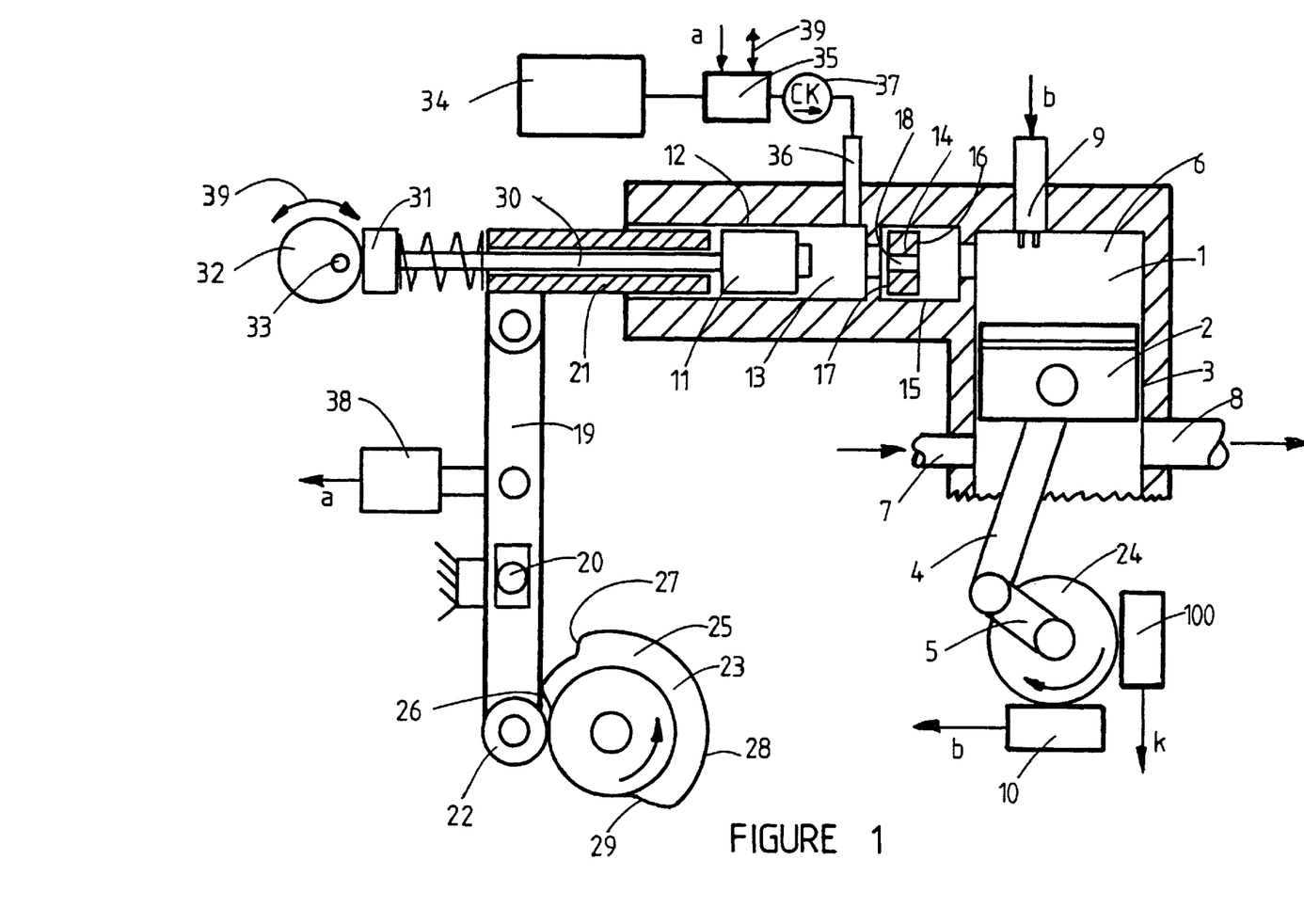

(vi) Engine torque is adjusted by adjusting the fuel quantity and the air quantity in the displacer volume only. Hence throttling of the principal engine air mass, going into the variable volume chamber, is not used to control engine torque output. In this way engine friction losses to pumping work, caused by intake throttling, is avoided, and increased engine efficiency results at reduced torque output as in the Texaco Combustion Process;

(vii) The engine fuel has been premixed with air and largely evaporated, while inside the displacer volume. Thus, during subsequent burning of the stratified mixture in the variable volume chamber, little or no soot will be formed since very little of the fuel is a liquid therein. This is one of the beneficial objects of this invention, to obtain the antiknock and efficiency benefits of the Texaco Combustion Process, while avoiding the exhaust soot problems consequent upon injecting liquid fuel into the burning zones;

(viii) By using several separate exit flow passages the injected air fuel mixture can be directed into almost all portions of the air mass inside the variable volume chamber. Thus at maximum torque output, almost all of the air mass in the variable volume chamber can be utilized for burning. This is another one of the beneficial objects of this invention, to utilize the available engine air mass more completely than is possible with the Texaco Combustion Process, wherein a single jet of liquid fuel is injected into the air mass;

(ix) By using several separate exit flow passages, each equipped with an exit valve and valve driver to open and close the exit passage, the number of exit flow passages, and hence the number of jets of air fuel vapor mixture injected into the variable volume chamber, can be reduced as engine torque is reduced. Correspondingly the volume of the displacer volume is reduced in order to maintain a fuel rich mixture therein. A controller is used here, responsive to engine timing and torque setting, and operative to adjust fuel quantity, displacer volume, and number of exit flow passages opened during the combustion time interval, in approximate proportion to torque output;

(x) In these ways the air fuel vapor stratifiers of this invention can be used to achieve the benefits of the Texaco Combustion Process, while avoiding its principal disadvantages;

2. Modified forms of the invention:

a. A pressure compensator piston, freely and sealably operative within a pressure compensator cylinder, can be advantageously used in those engine applications where a minimum interruption of the burning process is desired. One side of the piston and end of the cylinder is connected to the variable volume chamber, and the other side is connected to the displacer volume. When burning commences in the variable volume chamber, the consequent rapid rise of pressure therein is transmitted, by the pressure compensator piston, into a corresponding pressure rise in the displacer volume. In this way the flow of displacer air fuel mixture into the variable volume chamber, and hence the burning process therein, remains largely continuous and uninterrupted, while the displacer piston is moving into the displacer volume during the combustion time interval. In the absence of such a pressure compensator scheme the flow of displacer mixture into the variable volume will occur in pulses and a pulsating burning process will result;

b. In most engine applications it will be preferred that the displacer piston remain within the displacer volume throughout the engine expansion time interval, to prevent a backflow of hot burned gases into the displacer volume during displacer piston retraction;

c. In most engine applications it will be preferred that the displacer piston displace essentially the entire displacer volume of air fuel vapor mixture into the variable volume chamber for each engine cycle. Were any appreciable portion of the displacer mixture retained within the displacer volume, through several cycles of compression and expansion, the compression ignition time delay thereof could be used up, resulting in the occurrence of compression ignition within the displacer volume. Such compression ignition within the displacer volume is undesirable, as causing overheating of the displacer parts, and an increase of heat losses to the engine cooling jacket. The air fuel ratio mixture limits, within which compression ignition can occur are much wider than the spark ignition or inflammable limits;

3. Example forms of the invention:

A. One particular example of an air fuel vapor stratifier of this invention is shown schematically in FIG. 1, installed on a two stroke cycle, single cylinder engine. The engine comprises the following elements:

a. The variable volume chamber, 1, is enclosed by the piston, 2, and cylinder, 3. The piston, 1, is reciprocated by action of the internal combustion engine mechanism comprising a connecting rod, 4, and crank and crankshaft, 5. This piston motion creates a cycle of variation of the volume of the variable volume chamber, 1. When the piston is at top dead center, this minimum volume of the variable volume defines the combustion chamber end, 6, of the engine.

b. The two stroke cycle engine of FIG. 1 comprises an intake port, 7, through which air for combustion is supplied into the variable volume chamber during an intake time interval when the piston, 2, has uncovered the intake port, 7.

c. The engine of FIG. 1 further comprises an exhaust port, 8, through which burned gases leave the variable volume chamber during an exhaust time interval when the piston, 2, first uncovers the exhaust port, 8;

d. On the piston upstroke, the air inside the variable volume, 1, is compressed, after the intake port, 7, and exhaust port, 8, are covered by the piston, 2, during a compression time interval;

e. On the next piston downstroke, the burned gases inside the variable volume, 1, are expanded, during an expansion time interval, which ends when the exhaust port, 8, is uncovered by the piston, 2, to commence the next exhaust time interval;

f. Whenever fuel and air are both present within the variable volume chamber, combustion can take place during such a potential combustion time interval. The actual combustion time interval commences when this fuel air mixture is ignited, as by a spark at spark electrodes, 9, energized from a spark energizer and timer, 10. For reasons of engine cycle efficiency the combustion time interval preferably commences during the latter portions of the compression time interval and ends during the early portions of the expansion time intervals, and the spark energizer, 10, is timed accordingly;

g. A two stroke cycle engine is shown schematically in FIG. 1, but the air fuel vapor stratifiers of this invention can also be used on four stroke cycle engines, and other equivalents, such as the Wankel engine.

Figure 2:
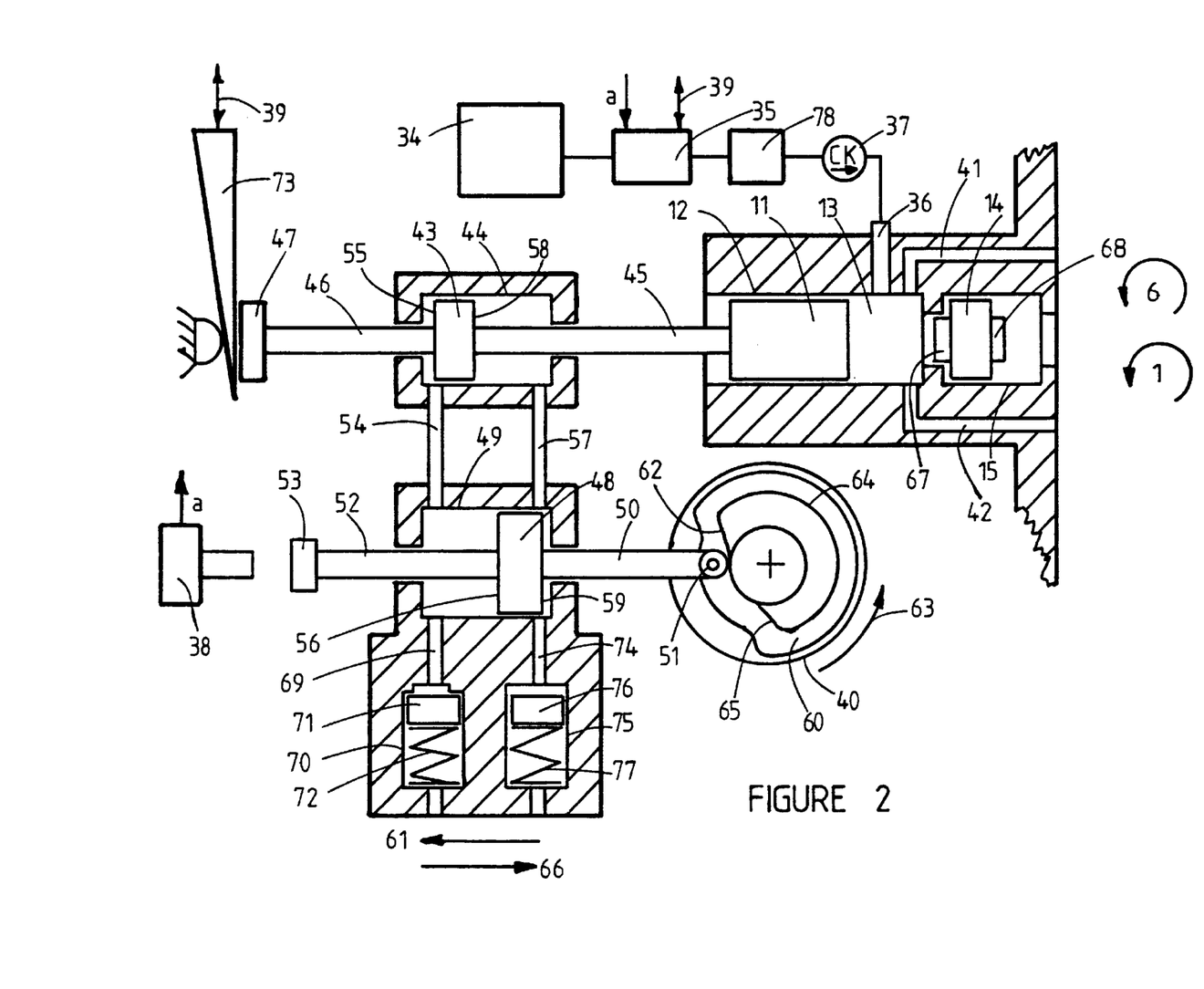
Figure 3:
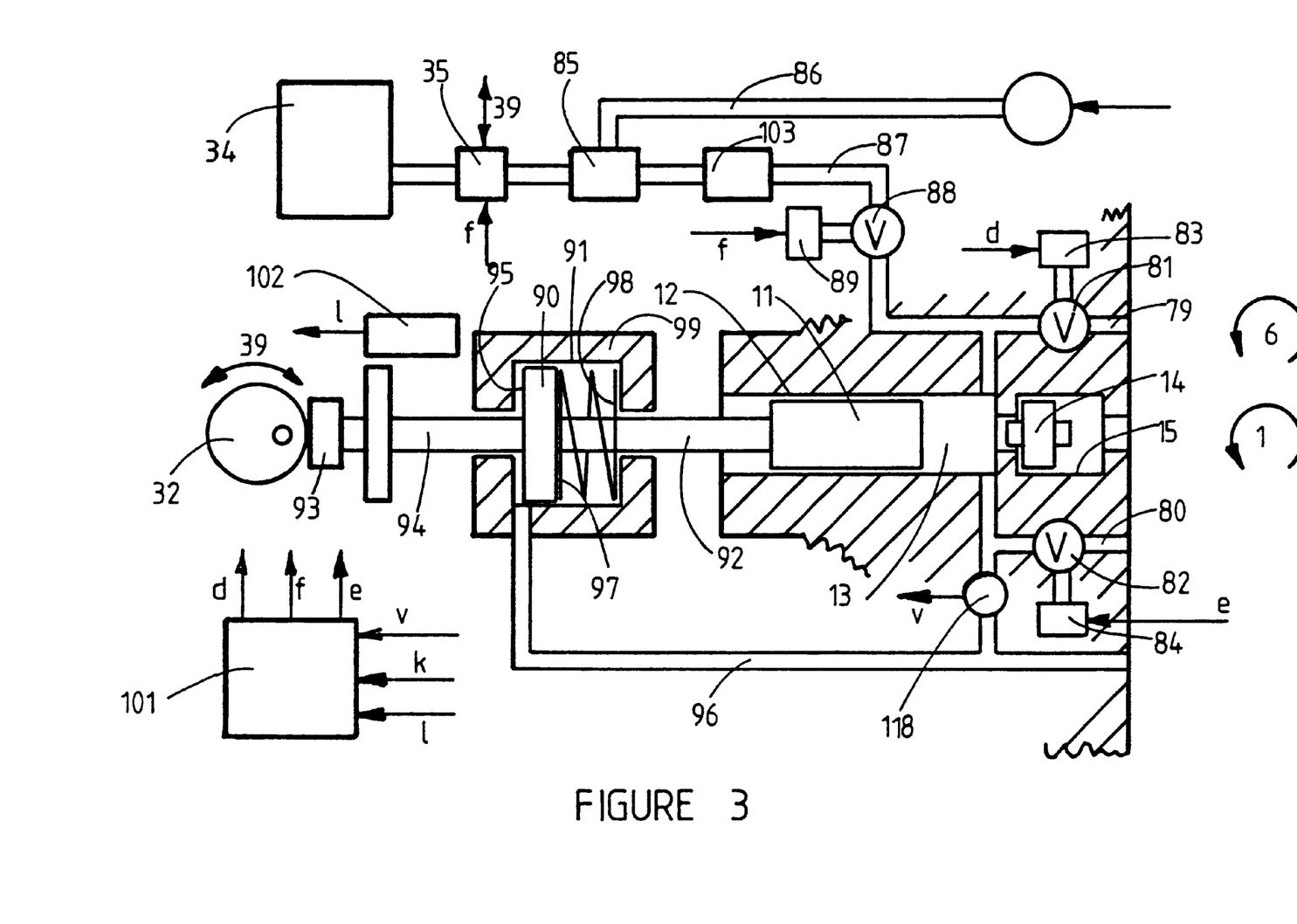
Figure 4:
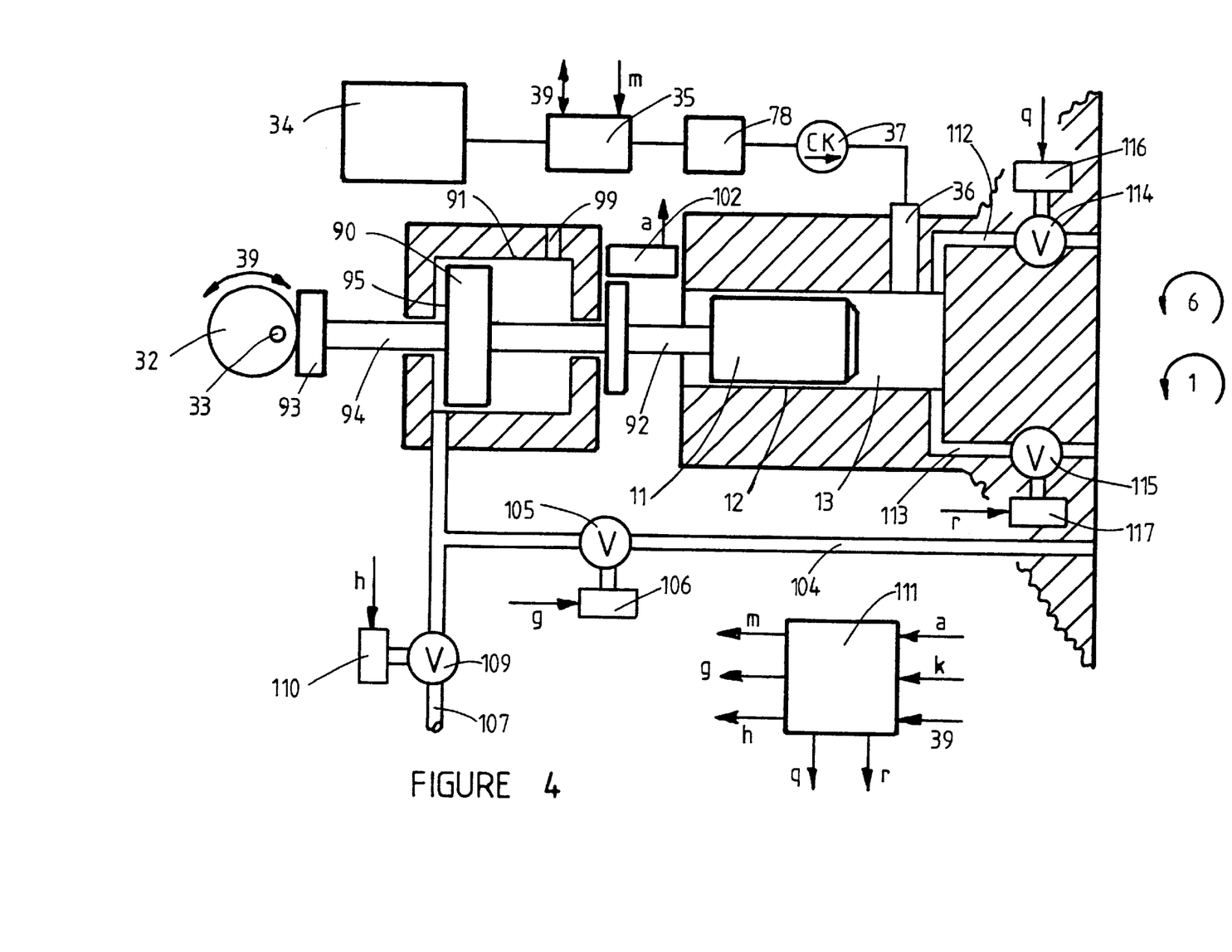

For this invention, each engine cylinder is equipped with at least one air fuel vapor stratifier, connecting into the combustion chamber end, 6, of the variable volume chamber, 1. The example air fuel vapor stratifier shown in FIG. 1 is mechanically driven from the engine crankshaft, 5, and comprises:

h. The displacer piston, 11, operates sealably within the displacer cylinder, 12, and these enclose the displacer volume, 13;

i. The pressure compensator piston, 14, operates freely and sealably within the pressure compensator cylinder, 15, with one side, 16, open to the variable volume chamber, 1, and the opposite side, 17, open to the displacer volume, 13.

j. The single exit flow passage, 18, for this FIG. 1 example, passes through the pressure compensator piston, 14, to connect the displacer volume, 13, into the combustion chamber end, 6, of the variable volume chamber, 1;

k. The displacer piston, 11, is moved into the displacer volume, 13, during the combustion time interval, by the mechanical displacer piston driver of FIG. 1, which comprises:
  i. The driver lever, 19, pivoted at the fixed pivot, 20, connects the sleeve, 21, to the driver cam follower, 22;
  ii. The driver and timer cam, 23, is driven at crankshaft speed, for the two stroke cycle engine of FIG. 1, and directly from the engine crankshaft, 5, as via gears, 24, 25;
  iii. The driver and timer cam, 23, acts on the driver cam follower, 22, to move the displacer piston, 11, into the displacer volume, 13, during the combustion time interval, by action of the stepped portions, 26, 27, of the cam, 23;
  iv. For the particular example displacer piston driver, shown in FIG. 1, a two step, 26, 27, cam, 23, is shown which creates a pulsed flow of displacer volume gases into the variable volume chamber, 1. But a single such pulse may be preferred in many engine applications, for which the cam, 23, will have but a single driver step;
  v. The raised portion, 28, of the driver and timer cam, 23, holds the displacer piston, 11, fully into the displacer volume, 13, throughout the expansion time interval, and preferably through the exhaust time interval, so that hot burned gases do not backflow into the displacer volume;
  vi. The retractor step, 29, on the driver and timer cam, 23, allows retraction of the displacer piston, 11, out of the displacer volume, 13, to take place, preferably during the compression time interval, when the pressure in the variable volume chamber, 1, acts via the exit flow passage, 18, as a displacer piston retractor;

l. The displacer piston extension bar, 30, and pad, 31, together with the volume cam, 32, rotatable about the center, 33, provide a volume adjustor to adjust the volume of the displacer volume, 13, while the engine is running. The volume cam, 32, is shown in FIG. 1, adjusted for maximum displacer volume. When the cam, 32, is rotated 180 degrees, about the fixed center, 33, the displacer volume is minimum;

m. For engines of moderate or higher speed, cushions, such as pneumatic cushions, will be preferred between the displacer piston, 11, and the driver sleeve, 21, to minimize mechanical impact during displacer piston driving. Partially sealable operation of the sleeve, 21, within the cylinder, 12, and on the bar, 30, could be used as such a pneumatic cushion. Similar pneumatic cushions may also be preferred within the pad, 31, acting between the pad and the volume cam, 32, during displacer piston retraction;

n. For the FIG. 1 form of this invention the displacer volume, 13, is used as the mixer, where fuel and displacer air are mixed to generate the displacer air fuel vapor mixture therein, prior to each combustion time interval. During the compression time interval, a displacer air portion is transferred from the variable volume chamber, 1, into the displacer volume, 13, via the open exit flow passage, 18. Concurrently fuel from the engine fuel source, 34, is delivered by the fuel delivery pump, 35, and nozzle, 36, into the displacer volume, 13, while the displacer piston, 11, is being retracted out of the displacer volume during the compression time interval. A check valve, 37, functions as a flow control to prevent backflow of air fuel mixture, when the displacer piston is moving into the displacer volume, thus assuring that the air fuel mixture flows out of the displacer volume, 13, only by way of the exit flow passage, 18, during the combustion time interval. The fuel delivery pump, 35, and nozzle, 36, are timed by the displacer piston retraction sensor, 38, to deliver fuel into the displacer volume during retraction of the displacer piston, when the displacer air is being compressed into the displacer volume, The fuel delivery pump, 35, delivers fuel at a pressure greater than the pressure in the displacer volume, 13.

o. The fuel delivery pump, 35, and nozzle, 36, further comprise a fuel quantity adjustor, to adjust the fuel quantity delivered into the displacer volume mixer, 13, for each engine cycle. Engine torque output is adjusted in this way, via a torque lever, 39. In order to keep the fuel to air ratio of the air fuel mixture inside the displacer volume within desired limits, the volume of the displacer volume, 13, is also adjusted by the torque lever, 39, acting on the volume adjustor, 32.

p. Present automotive fuel systems, slightly modified, are an example of a suitable fuel delivery pump, 35, and nozzle, 36. These present automotive fuel systems use a common rail, supplied with fuel at a constant pressure from the fuel pump, together with a solenoid operated nozzle, whose time and duration of opening are set by an electronic controller, responsive to the engine throttle and an engine crank angle and cycle sensor. For purposes of this invention, the fuel pump and common rail would need to operate at pressures above that prevailing in the displacer volume, and nozzle opening would need to be timed to coincide with displacer piston retraction;

B. Another particular example of an air fuel vapor stratifier of this invention is shown schematically in FIG. 2. Only a portion of the variable volume chamber, 1, is shown in FIG. 2, but the other parts of the engine can be similar to those shown in FIG. 1, and operate as described hereinabove. This example air fuel vapor stratifier, shown in FIG. 2, is driven mechanically and hydraulically from the engine crankshaft, 5, as by gears, 24, 40, and comprises:

a. The displacer piston, 11, displacer cylinder, 12, displacer volume, 13, pressure compensator piston, 14, and pressure compensator cylinder, 15, are similar to, and operate similarly to, these elements of the FIG. 1 form of the invention, as descried hereinabove;

b. The fuel mixer and supply system, comprising the fuel source, 34, the fuel delivery pump, 35, and nozzle, 36, the check valve, 37, the retraction sensor, 38, the fuel quantity and engine torque adjustor, 39, are similar to and operate similarly to these elements of the FIG. 1 form of the invention as described hereinabove;

c. Two separate exit flow passages, 41, 42, connect the displacer volume, 13, into two separate places at the combustion chamber end, 6, of the variable volume chamber, 1, for this FIG. 2 example form of air fuel vapor stratifier;

d. The displacer piston, 11, is moved into the displacer volume, 13, during the combustion time interval, by the mechanical hydraulic displacer piston driver of FIG. 2, which comprises:

i. The driver piston, 43, operates sealably within the driver cylinder, 44; and is connected by the driver piston rod, 45, to the displacer piston, 11, and by the adjustor piston rod, 46, to the pad, 47, of the displacer volume adjustor;

ii. The hydraulic pump piston, 48, operates sealably within the pump cylinder, 49, and is connected by the pump piston rod, 50, to the captured cam follower, 51, and by the retractor sensor piston rod, 52, to the pad, 53, which actuates the retraction sensor, 38;

iii. The cylinders, 44, 49, are filled on both sides of the pistons, 43, 48, with hydraulic fluid. The driver connection, 54, connects the driving side, 55, of the driver piston, 43, to the driver side, 56, of the pump piston, 48. The retractor connection, 57, connects the retractor side, 58, of the driver piston, 43, to the retractor side, 59, of the pump piston, 48.

iv. The driver and timer cam, 60, is driven at crankshaft speed for the two stroke cycle engine of FIG. 1, and directly from the engine crankshaft, 5, as via gears, 40, 24;

v. The driver and timer cam, 60, acts on the captured cam follower, 51, to move the pump piston, 48, in its displacer direction, 61, by action of the cam step, 62, for the indicated rotation, 63: This displacer motion of the pump piston acts, via connection, 54, to move the driver piston 43, and the connected displacer piston, 11, in the displacer direction which moves the displacer piston, 11, into the displacer volume, 13, and these motions are timed by the cam, 60, to occur during the combustion time interval;

vi. The raised portion, 64, of the driver and timer cam, 60, holds the pump piston, 48, the driver piston, 43, and hence the displacer piston, 11, in a fixed position, with the displacer piston, 11, fully into the displacer volume, 13, throughout the expansion and exhaust time intervals;

vii. The camstep, 65, acts on the captured cam follower, 51, to move the pump piston, 48, in its retraction direction, 66, and thus to move the driver piston via connection, 57, together with the displacer position, 11, in the retraction direction to retract the displacer piston, 11, out of the displacer volume, 13, and these retraction motions are timed by the cam, 60, to occur during the compression time interval;

viii. The pump piston area and displacement can somewhat exceed the driver piston area and displacement, so that the displacer piston fully displaces essentially all of the air fuel mixture out of the displacer volume, and into the variable volume chamber. This full displacement of the mixture is further assisted by the cushion piston extension, 67, 68, on the pressure compensator piston, 14;

ix. The excess fluid displaced by the pump piston, 48, above the fluid displacement of the driver piston, 43, during displacement motion, flows via passage, 69, into the displacer reservoir cylinder, 70, and moves the sealed piston, 71, against the spring, 72. The spring, 72, exerts a force on the piston, 71, always sufficient to hold the driver piston, 43, and displacer piston, 11, stationary against the force of the pressure in the variable volume chamber, 1.

x. The extent of retraction of the displacer piston, 11, out of the displacer volume, 13, can be adjusted by adjusting the wedge stop bar, 73, relative to the pad, 47, on the adjustor piston rod, 46, In this way the volume of the displacer volume, 13, can be adjusted while the engine is running;

xi. The excess fluid displaced by the pump piston, 48, above the fluid displaced by the driver piston, 43, during retraction, flows via passage 74, into the retraction reservoir, 75, and moves the sealed piston, 76, against the spring, 77;

xii. The spring side of the displacer reservoir and the retraction reservoir is vented to atmosphere;

xiii. When low vapor pressure fuels are being used a fuel heater, 78, may be used to assist in the evaporation of the liquid fuel in the displacer volume;

C. Another particular example of an air fuel vapor stratifier of this invention is shown schematically in FIG. 3. Only a portion of the variable volume chamber, 1, is shown in FIG. 3, but the other parts of the engine can be similar to those shown in FIG. 1, and operate as described hereinabove. This example air fuel vapor stratifier, shown in FIG. 3, is driven pneumatically using air, under pressure, from the variable volume chamber, 1, for driving, and comprises:

a. The displacer piston, 11, displacer cylinder, 12, displacer volume, 13, pressure compensator piston, 14, pressure compensator cylinder, 15, are similar to and operate similarly to these elements of the FIG. 1 form of the invention, as described hereinabove;

b. Two separate exit flow passages, 79, 80, connect the displacer volume, 13, into two separate places at the combustion chamber end, 6, of the variable volume chamber, 1. Each of these exit flow passages, 79, 80, comprises an exit valve, 81, 82, with valve drivers, 83, 84, which open and close the exit flow passages;

c. The fuel air mixer and supply system for this FIG. 3 form of the invention comprises a mixer, 85, separate from the displacer volume, 13, and fuel and outside air are mixed in this mixer to create an air fuel mixture, which is then transferred into the displacer volume. This form of fuel air mixer and supply system comprises:

i. A fuel supply source, 34, and a fuel delivery pump, 35, deliver fuel into the separate air fuel mixer, 85, when the displacer piston, 11, is being retracted out of the displacer volume, 13. The fuel delivery pump, 35, comprises a fuel quantity adjustor, to adjust the fuel quantity delivered into the separate mixer, 85, during each engine cycle. Engine torque output is adjusted in this way via a torque lever, 39.

ii. Displacer air is supplied into the separate mixer, 85, via the air flow connection, 86, from the atmosphere;

iii. The air fuel mixture connection, 87, connects the mixer, 85, into the displacer volume, 13, via the mixer valve, 88, with valve driver, 89, which opens and closes the air fuel mixture connection, 87;

d. The pneumatic driver piston, 90, operates sealably within the pneumatic driver cylinder, 91, and connects to the displacer piston, 11, by the driver piston rod, 92, and connects to the adjustor pad, 93, by the adjustor piston rod, 94. The area of the driver piston, 90, is greater than the area of the displacer piston, 11;

e. The driver side, 95, of the driver piston 90, is acted on by gas pressure in the variable volume chamber, 1, via the pressure connection, 96. The retraction side, 97, of the driver piston, 90, is acted on by the retraction spring, 98, and this side of the piston is vented to atmosphere via vent, 99;

f. During the compression time interval the rising pressure in the variable volume chamber, 1, acts on the driver side, 95, of the driver piston, 90, which moves the displacer piston, 11, into the displacer volume, 13, thus compressing the air fuel mixture inside the displacer volume, 13, the mixture valve, 88, being then closed.

g. The controller, 101, receives inputs from an engine crank angle and cycle sensor, 100, shown in FIG. 1, and also from a pressure sensor, 118, of the pressure difference between the displacer volume, 13, and the variable volume chamber, 1. The controller operates the valve drivers, 83, 84, so that the exit flow passages, 79, 80, are opened when displacer volume pressure equals or exceeds variable volume chamber pressure during the combustion time interval. The compressed displacer air fuel mixture then is forced out of the displacer volume, 13, and into the combustion chamber end, 6, of the variable volume chamber, 1;

h. The expansion which follows after combustion causes the pressure in the variable volume chamber, 1, to decrease, and this pressure will reach approximately atmospheric during exhaust. The retraction spring, 98, can then act via the piston, 90, to retract the displacer piston, 11, out of the displacer volume, 13. The retraction sensor, 102, is another input to the controller, 101, which then operates the valve driver, 89, to open the air fuel mixture connection, 87, and to actuate the fuel delivery pump, 35, to deliver the adjusted fuel quantity into the mixer, 85. The retraction motion of the displacer piston, 11, causes air to flow into the mixer, 85, via the air connection, 86, and resultant air fuel mixture to flow into the displacer volume, 13, via the now open mixture connection, 87. The exit flow valves, 81, 82, and exit passages, 79, 80, are closed during retraction of the displacer piston, 11, out of the displacer volume. In this way the displacer volume is refilled with fresh air fuel mixture for the next engine cycle;

i. At maximum engine torque, all of the exit passages, 79, 80, are preferably opened, but at reduced torque, only some of the exit flow passages need be open during the combustion time interval, since less air fuel mixture is being displaced into the variable volume chamber. Simple check valves can be used as the exit valves, 81, 82, and the separate pressure difference sensor, 118, is not then needed. But the number of exit flow passages opened, during the combustion time interval, cannot then be adjusted in proportion to engine torque. Check valves can alternatively be used, as pressure difference sensors, in series with controller actuated valves, 81, 82, and a separate pressure difference sensor, 118, will not then be needed;

j. The volume adjustor cam, 32, provides a method for adjusting the displacer volume, 13, while the engine is running as described hereinabove for the FIG. 1 form of the invention. The displacer volume can be adjusted by the torque lever, 39, to be approximately proportional to fuel quantity as described hereinabove;

k. An air fuel mixture heater, 103, can be used to assist the evaporation of the fuel when low vapor pressure fuels are being used;

l. A conventional carburetor can be used as an alternative to the fuel delivery pump, 35, and mixer, 85, and will automatically adjust fuel quantity in proportion to displacer air quantity flowing through the mixer, 85;

D. Another particular example of an air fuel vapor stratifier of this invention is shown schematically in FIG. 4. Only a portion of the variable volume chamber, 1, is shown in FIG. 4, but the other parts of the engine can be similar to those shown in FIG. 1, and operate as described hereinabove. This example air fuel vapor stratifier, shown in FIG. 4, is driven pneumatically using air, under pressure, from the variable volume chamber, 1, for driving and retracting, and comprises:

a. The displacer piston, 11, displacer cylinder, 12, displacer volume, 13, are similar to and operate similarly to, these elements of the FIG. 1 and FIG. 2 forms of the invention as described hereinabove;

b. The fuel mixer and supply system, comprising the fuel source, 34, the fuel delivery pump, 35, and nozzle, 36, the check valve, 37, the fuel quantity and engine torque adjustor, 39, are similar to and operate similarly to these elements of the FIG. 2 form of the invention as described hereinabove;

c. The pneumatic driver piston 90, operates sealably within the pneumatic driver cylinder, 91, and connects to the displacer piston, 11, by the driver piston rod, 92, and connects to the adjustor pad, 93, by the adjustor piston rod, 94. The area of the driver piston, 90, is greater than the area of the displacer piston, 11;

d. The driver side, 95, of the driver piston, 90, can be acted on by gas pressure in the variable volume chamber, 1, via the pressure connection, 104, with pressure valve, 105, and valve driver, 106, which opens and closes the pressure connection, 104. Alternatively the driver side, 95, of the driver piston, 90, can be acted on by atmospheric pressure via the vent connection, 107, with vent valve, 109, and valve driver, 110, which opens and closes the vent connection, 107. The retraction side, 97, of the driver piston, 90, is vented to atmosphere via vent, 99;

e. Two separate exit flow passages, 112, 113, are equipped with exit valves, 114, 115, with valve drivers, 116, 117, which open and close the exit flow passages, 112, 113;

f. An engine crank angle and cycle sensor, 100, shown in FIG. 1, is an input to the driver timer controller, 111, which controls the valve drivers, 106, 110, 116, 117, so that:

i. Pressure valve, 105, and pressure connection, 104, are open, and vent valve, 109, and connection, 107, are closed, and at least one of exit valves, 114, 115, and exit flow passages, 112, 113, are open during the combustion time interval. The driver piston, 90, thus forces the displacer air fuel mixture out of the displacer volume, 13, and into the combustion chamber end, 6, of the variable volume chamber, 1, via those exit flow passages, 112, 113, whose exit valves, 114, 115, are open.

ii. Pressure valve, 105, and pressure connection, 104, remains open, and vent valve, 109, and connection, 107, remains closed throughout the expansion time interval. The displacer piston will thus be held fully inside the displacer volume, 13, throughout the expansion time interval to prevent backflow of hot burned gases into the displacer volume;

iii. Pressure valve, 105, and pressure connection, 104, are closed, and vent valve, 109 and vent connection, 107, are open, and at least one of the exit valves, 114, 115, and exit flow passages, 112, 113, are open, during a portion of the compression time interval preceding the combustion time interval. The displacer piston, 11, is thus forced by compression pressure rise in the variable volume chamber, 1, to retract out of the displacer volume, and the driver piston, 90, is also retracted;

iv. At least one of the exit valves, 114, 115, and exit flow passages, 112, 113, remains open throughout the compression time interval, so that a fresh charge of displacer air can be compressed into the displacer volume, 13;

v. While exit valves, 114, 115, are not necessary for this FIG. 4 form of the invention, they provide a method for adjusting the number of exit flow passages open, and hence the number of burning zones created, in proportion to engine torque and fuel flow rate. For this adjustment of the number of exit flow passages open the engine torque lever, 39, provides an additional input to the controller, 111;

g. The retraction sensor, 102, is another input to the controller, 111, which controls the fuel delivery pump, 35, to deliver fuel into the displacer volume during displacer piston retraction, when displacer air is being compressed also into the displacer volume. The fuel delivery pump, 35, delivers fuel at a pressure greater than the pressure in the displacer volume, 13. In this way an air fuel mixture is mixed inside the displacer volume during retraction of the displacer piston;

h. A pressure compensator piston and cylinder are not used in this FIG. 4 form of air fuel vapor stratifier. In consequence, the rapid pressure rise due to combustion in the variable volume chamber, 1, will stop and briefly somewhat reverse, the flow of displacer mixture into the variable volume chamber. The flow of displacer mixture into the variable volume chamber will thus occur in a pulsating manner, leading to a pulsating burning process. The resulting gas turbulence, in the variable volume chamber, may increase the mixing of displacer mixture with air therein, and in this way increase the extent of combustion utilization of the available air quantity;

i. The compressed air from the variable volume chamber, 1, used to drive the driver pistons, 90, for the pneumatic driver schemes, shown in FIG. 3 and FIG. 4, also expands during the engine expansion time interval. Thus relatively little compression work loss results for these pneumatic driver schemes. However, if fuel portions also enter the pneumatic driver system, these fuel portions may not burn, or may only burn late during the expansion time interval. Hence a loss of fuel efficiency may result if fuel portions enter the pneumatic driver system, and this is a potential disadvantage of these pneumatic drivers, particularly for engines seeking to maximize the combustion use of the air available in the variable volume chamber;

j. The controllers, 101 and 111, for the FIG. 3 and FIG. 4 forms of the invention are preferably electronic controllers when electronic engine crank angle and cycle sensors, 100, and displacer piston retraction sensors, 102, are used. For the FIG. 1 and FIG. 2 forms of the invention the controllers are mechanical;

4. Displacer Mixture Ratio:

a. Preferably, unevaporated liquid portions of the air fuel vapor mixture within the displacer volume are minimized in order to minimize undesirable soot formulation and emissions, from such liquid portions. Fuel or mixture heaters can be used, as described hereinabove, to increase the extent of fuel evaporation;

b. The air fuel ratio of the displacer mixture is preferably richer in fuel than the rich inflammability limit, in order to prevent flame flashback from the combustion chamber into the displacer volume;

c. For a given engine torque output, and hence fuel flow rate, the fuel richer the displacer mixture used, the smaller the displacer air quantity, and hence the smaller the needed displacer volume. But use of excessively fuel rich displacer mixtures can result in increased soot formation, even when the fuel is fully evaporated;

d. If displacer air fuel mixture ratios are used which are within the inflammable limits, flashback into the displacer volume can be avoided by placing flame arrester screens at the variable volume chamber end of each exit flow passage;

5. Sizing

The ratio of maximum displacer volume (VDD) to engine piston displacement volume (VDE) for use in a modified Texaco Combustion Process, as described hereinabove, depends upon the fuel to air ratio used in the displacer mixture. In general fuel richer displacer mixtures use a smaller displacer volume.

The ratio of displacer volume to engine piston displacement volume is best determined experimentally for each engine application. The following approximate relations can be used to estimate this ratio for preliminary sizing purposes:

$$\frac{(VDD)}{(VDE)} = \frac{(B)}{(CRC-1)} \frac{(FAO)}{(FAD-FAO)}$$

Wherein:
(FAD)=Mass ratio of fuel to air in the displacer volume mixture;
(FAO)=Overall mass ratio of fuel to air, including the air in the variable volume chamber;
(CRC)=Volumetric compression ratio of the variable volume chamber;
(B)=Ratio of variable volume chamber volume at start of combustion time interval to the clearance volume of the variable volume chamber;
(VDE)=Engine piston displacement volume per cylinder;
(VDD)=Displacer volume;

Any consistent system of units can be used for this relation.

The above relation for the ratio of displacer volume to engine piston displacement volume is useable for those forms of this invention, such as are shown in FIG. 1, FIG. 2, and FIG. 4, wherein displacer air is supplied from the variable volume chamber during compression. As engine torque, and hence fuel quantity, change, so also can the displacer volume, VDD, be adjusted proportionately, in order to maintain the fuel to air ratio in the displacer volume, FAD, approximately constant.

For those forms of this invention wherein displacer air is supplied from the atmosphere into mixer, separate from the displacer volume, such as shown in FIG. 3, the following approximate relation can be used to estimate the ratio of displacer volume to engine piston displacement volume:

$$\frac{(VDD)}{(VDE)} = \frac{(FAO)}{(FAD-FAO)}$$

The displacer volume, VDD, required for these forms of the invention, wherein displacer air is supplied from the atmosphere into a separate mixer, will need to be much larger than the displacer volume for those other forms of the invention, wherein displacer air is transferred from the variable volume chamber during compression.

6. An example usage of the invention:

Air fuel vapor stratifiers of this invention can be used advantageously in many different internal combustion engine applications. The following example illustrates how very large benefits can be achieved by combining the use of air fuel vapor stratifiers of this invention with other engine modifications.

Large improvements in automobile miles per gallon can be achieved by reducing engine friction power losses. Engine friction losses result principally from pumping work due to intake throttling at part load, and internal rubbing friction, particularly between piston rings and cylinder. Internal rubbing friction is reduced in small displacement engines, operated at low speeds, but such engines have very poor torque and performance capabilities. High torque and performance capabilities can be restored to small displacement, low speed, engines by use of very high intake supercharging of the order of three to four atmospheres, with engine exhaust gas driven turbochargers. But severe engine knock will occur in a low speed engine, of conventional design when supercharged to three or four atmospheres intake pressure.

This engine knock can be prevented by use of a modified Texaco Combustion Process, created by use of an air fuel vapor stratifier of this invention, as described hereinabove. Pumping work loss at part load is also avoided, since intake throttling is not used, engine torque being controllable by control of fuel flow when the resulting stratified type combustion is used.

Thus by combining an air fuel vapor stratifier of this invention, with small displacement, low speed engines, using very high intake supercharge, automobile miles per gallon can be greatly increased, without sacrifice of vehicle performance, or safety, or comforts.

Entirely similar miles per gallon benefits can alternatively be obtained by a similar use of the original Texaco Combustion Process, or by use of small displacement, low speed, highly supercharged diesel engines, which are also unthrottled. But for both of these alternative methods, liquid fuel is injected directly into the engine combustion chamber, resulting in a high yield of undesirable soot and other emissions. In an air fuel vapor stratifier of this invention the liquid fuel is mixed and evaporated into a separate air portion. The resulting air fuel vapor mixture is then injected into the combustion chamber, and little or no soot is formed, since liquid fuel is not present within the burning zones. This illustrates how air fuel vapor stratifiers of this invention can achieve the benefits of the Texaco Combustion Process, while escaping its soot and emissions disadvantages.

7. Mechanical displacement volume adjustors are shown in the FIG. 1, FIG. 2, FIG. 3, and FIG. 4 forms of this invention, but electrical adjustors, such as stepping motors, and other volume adjustors can also be used for the apparatus and purposes of this invention.

8. Several different example forms of air fuel vapor stratifies of this invention have been described hereinabove for illustrative purposes. But it is not intended to limit the invention thereby.

Having thus described my invention, what I claim is:

1. In a piston internal combustion engine comprising: at least one combined means for compressing and expanding gases, each said combined means comprising an internal combustion engine mechanism comprising a variable volume chamber for compressing and expanding gases, and drive means for driving said internal combustion engine mechanism and varying the volume of said chamber through repeated cycles; said variable volume chamber comprising a combustion chamber end at the minimum volume portion of said variable volume;

each said variable volume cycle comprising a compression time interval, when said variable volume is sealed and decreasing, followed by an expansion time interval, when said variable volume is sealed and increasing, these two time intervals together being a compression and expansion time interval;

each said combined means for compressing and expanding further comprising intake means for admitting reactant gases into said variable volume chamber prior to each said compression time interval, exhaust means for removing reacted gases from said variable volume chamber after each said expansion time interval;

each said variable volume cycle further comprising an exhaust time interval when said variable volume is opened to said exhaust means, followed by an intake time interval when said variable volume is opened to said intake means, these two time intervals being an exhaust and intake time interval; said exhaust and intake time interval following after a preceding expansion time interval and preceding a next following compression time interval; said piston internal combustion engine further comprising a source of supply of reactant gas containing appreciable oxygen gas, such as air, to each said intake means for admitting reactant gases into said variable volume chamber; each cycle of said variable volume chamber further comprising a potential combustion time interval comprising that portion of said compression and expansion time interval during which fuel and reactant gas containing appreciable oxygen gas are both present within said variable volume chamber; each cycle of said variable volume chamber further comprising a combustion time interval during which the mixture of fuel and reactant gas containing appreciable oxygen gas is ignited and burned;

wherein the improvement comprises adding to said piston internal combustion engine at least one air fuel vapor stratifier for each said variable volume chamber of said piston internal combustion engine, each said air fuel vapor stratifier comprising:

a displacer piston sealably operative within a displacer cylinder;

a displacer volume enclosed between said displacer cylinder and said displacer piston;

at least one exit flow passage between said displacer volume and said variable volume chamber and connecting into said variable volume chamber at the combustion chamber end thereof;

a displacer piston driver means for moving said displacer piston into said displacer volume;

a displacer piston retractor means for retracting said displacer piston out of said displacer volume;

a driver timer means for timing the moving of said displacer piston into said displacer volume so that the contents of said displacer volume are displaced out of said volume, via said exit flow passages, into said variable volume chamber, during said combustion time interval;

a retraction timer means for timing the retraction of said displacer piston out of said displacer volume, so that said retraction occurs during a portion of said exhaust and intake and compression time intervals;

a mixture generator means for creating an air fuel vapor mixture, within said displacer volume, so that said air fuel vapor mixture is present in said volume prior to each said combustion time interval;

said mixture generator means comprising, a source of displacer fuel, a source of displacer air, a mixer means for mixing said fuel into said displacer air, a flow control means for controlling the flow of said air fuel vapor mixture, so that said air fuel vapor mixture flows out of said displacer volume only via said exit flow passages;

volume adjustment means for adjusting the volume of said displacer volume, while said engine is running;

fuel quantity adjustment means for adjusting the fuel quantity in said air fuel vapor mixture inside said displacer volume.

2. In an internal combustion engine as described in claim 1:

wherein said displacer volume is essentially fully displaced by said displacer piston; and further comprising:

a pressure compensator piston sealably operative within a pressure compensator cylinder, one side of said piston and end of said cylinder being connected to said displacer volume, the other side of said piston and other end of said cylinder being connected to said variable volume chamber at the combustion chamber end thereof.

3. In an internal combustion engine as described in claim 1 and further comprising:

at least one set of spark electrodes located at the combustion chamber end of said variable volume chamber, and positioned where air fuel mixture, displaced out of said displacer volume, mixes with the gases contained within said variable volume chamber;

a spark energizer and timer means for creating electric sparks at said sets of spark electrodes, said sparks being timed, relative to said variable volume cycle, to occur during said combustion time interval.

4. In an internal combustion engine as described in claim 1:

wherein said retraction timer means times the retraction of said displacer piston out of said displacer volume during a portion of said compression time interval;

wherein said mixer means comprises said displacer volume;

wherein said source of displacer air is the variable volume chamber, and said displacer air is transferred from said variable volume chamber, into said displacer volume, via one or more of said exit flow passages, during said compression time interval;

wherein said source of displacer fuel comprises, a source of engine fuel and engine fuel delivery means for delivering said engine fuel into said displacer volume when said displacer piston is being retracted out of said displacer volume, and comprising means for adjusting the engine fuel quantity delivered into said displacer volume during each engine cycle, whereby an air fuel mixture is created in said displacer volume.

5. In an internal combustion engine as described in claim 4, wherein:

each of said exit flow passages further comprises an exit valve and valve driver which opens and closes said exit flow passage;

and further comprising:

an engine crank angle and cycle sensor;

a controller means for controlling the opening and closing of said exit valves in said exit flow passages, responsive to said engine crank angle sensor and operative upon said valve drivers in said exit flow passages so that:

at least one of said exit flow passages is open during said compression time interval;

each of said exit flow passages is open during at least a portion of said combustion time interval, for at least one engine operating condition;

throughout said combustion time interval at least one of said exit flow passages is open.

6. In an internal combustion engine as described in claim 1:

wherein said mixer means comprises an air fuel mixer separate from said displacer volume;

wherein said source of displacer fuel comprises a source of engine fuel and engine fuel delivery means for delivering said engine fuel into said separate air fuel mixer when said displacer piston is being retracted out of said displacer volume, and comprising means for adjusting the engine fuel quantity delivered into said separate air fuel mixer during each engine cycle;

wherein said source of displacer air is a flow connection from the atmosphere into said separate air fuel mixer;

wherein said mixer means further comprises an air fuel mixture flow connection from said separate air fuel mixer into said displacer volume, with a mixture valve and valve driver which opens and closes said mixture connection;

and further comprising:

each of said exit flow passages comprising an exit valve and valve driver which opens and closes said exit flow passage;

an engine crank angle and cycle sensor;

a controller means for controlling the opening and closing of said exit valves in said exit flow passages, and said mixture valve in said mixture connection, responsive to said engine crank angle and cycle sensor, and operative upon said valve drivers, so that:

each of said exit flow passages is open during at least a portion of said combustion time interval, for at least one engine operating condition;

throughout said combustion time interval at least one of said exit flow passages is open;

said mixture valve is open during a portion of said exhaust, intake, and compression time intervals, and is closed during said combustion and expansion time intervals.

7. In an internal combustion engine as described in claim 1:

wherein said displacer piston driver means, and said driver timer means, comprise a mechanical driver and timer means, driven directly from said drive means for driving said internal combustion engine mechanism, so that said displacer piston motion into said displacer volume is timed, relative to said variable volume cycle, to move said displacer piston into said displacer volume during said combustion time interval, and so that said displacer piston is held within said displacer volume throughout said expansion time interval;

wherein said displacer piston retractor means and said retractor timer means, retract said displacer piston out of said displacer volume during a portion of said intake and compression time intervals.

8. In an internal combustion engine as described in claim 1:

wherein said displacer piston driver means, said driver timer means, said displacer piston retractor means, and said retractor timer means, comprise a mechanical driver, retractor, and timer means, driven directly from said drive means for driving said internal combustion engine mechanism, so that:
    said displacer piston moves into said displacer volume during said combustion time interval;
    said displacer piston is held within said displacer volume throughout said expansion time interval;
    said displacer piston is retracted out of said displacer volume during a portion of said intake and compression time intervals.

9. In an internal combustion engine as described in claim 1:
    wherein said displacer piston driver comprises:
        a displacer piston pneumatic driver means for moving said displacer piston into said displacer volume, and comprising a driver piston, sealably operative within a driver cylinder, and connected to said displacer piston, the area of said driver piston being larger than the area of said displacer piston;
        that side of said driver cylinder, opposite to the connection to the displacer piston, comprising a vent connection to atmosphere, with a vent valve and valve driver which opens and closes said vent connection;
        that side of said driver cylinder, opposite to the connection to the displacer piston, comprising a pressure connection to the combustion chamber end of said variable volume chamber, with a pressure valve and valve driver which opens and closes said pressure connection;
        that side of said driver cylinder connected to the displacer piston being vented to atmosphere;
        wherein said driver timer means comprises:
            an engine crank angle and cycle sensor;
            a controller means for controlling the opening and closing of said vent valve in said vent connection, and said pressure valve in said pressure connection, responsive to said engine crank angle and cycle sensor, and operative upon said valve drivers, so that:
                said vent valve is open during a principal portion of said compression time interval;
                said vent valve is closed during said combustion time interval and said expansion time interval;
                said pressure valve is open during said combustion time interval and said expansion time interval;
                said pressure valve is closed when said vent valve is open.

10. In an internal combustion engine as described in claim 2:
    where said retraction timer means times the retraction of said displacer piston out of said displacer volume during a portion of said compression time interval;
    wherein said mixer means comprises said displacer volume;
    wherein said source of displacer air is the variable volume chamber and said displacer air is transferred from said variable volume chamber, into said displacer volume, via one or more of said exit flow passages, during said compression time interval;
    wherein said source of displacer fuel comprises a source of engine fuel and engine fuel delivery means for delivering said engine fuel into said displacer volume when said displacer piston is being retracted out of said displacer volume, and comprising means for adjusting the engine fuel quantity delivered into said displacer volume during each engine cycle, whereby an air fuel mixture is created in said displacer volume.

11. In an internal combustion engine as described in claim 10 and further comprising:
    each of said exit flow passages comprising an exit valve and valve driver which opens and closes said exit flow passage;
    an engine crank angle and cycle sensor;
    a controller means for controlling the opening and closing of said exit valves, in said exit flow passages, responsive to said engine crank angle sensor, and operative upon said valve drivers in said exit flow passages, so that:
        at least one of said exit flow passages is open during said compression time interval;
        each of said exit flow passages is open during at least a portion of said combustion time interval, for at least one engine operating condition;
        throughout said combustion time interval at least one of said exit flow passages is open.

12. In an internal combustion engine as described in claim 11, and further comprising:
    at least one set of spark electrodes located at the combustion chamber end of said variable volume chamber, and positioned where air fuel mixture, displaced out of said displacer volume, mixes with the gases contained within said variable volume chamber;
    a spark energizer and timer means for creating electric sparks at said sets of spark electrodes, said sparks being timed, relative to said variable volume cycle, to occur during said combustion time interval.

13. In an internal combustion engine as described in claim 12:
    wherein said displacer piston driver means, and said driver timer means, comprise a mechanical driver and timer means, driven directly from said drive means for driving said internal combustion engine mechanism, so that said displacer piston motion into said displacer volume is timed, relative to said variable volume cycle to move said displacer piston into said displacer volume during said combustion time interval, and so that said displacer piston is held within said displacer volume throughout said expansion time interval;
    wherein said displacer piston retractor means and said retractor timer means retract said displacer piston out of said displacer volume during a portion of said intake and compression time intervals.

14. In an internal combustion engine as described in claim 2:
    wherein said mixer means comprises an air fuel mixer separate from said displacer volume;
    wherein said source of displacer fuel comprises a source of engine fuel, and engine fuel delivery means for delivering said engine fuel into said separate air fuel mixer when said displacer piston is being retracted out of said displacer volume, and comprising means for adjusting the engine fuel quantity delivered into said separate air fuel mixer during each engine cycle;
    wherein said source of displacer air is a flow connection from the atmosphere into said separate air fuel mixer;
    wherein said mixer means further comprises an air fuel mixture flow connection from said separate air fuel mixer into said displacer volume, with a mixture valve and valve driver which opens and closes said mixture connection;

each of said exit flow passages comprising an exit valve and valve driver which opens and closes said exit flow passage;

and further comprising:

an engine crank angle and cycle sensor;

a controller means for controlling the opening and closing of said exit valves in said exit flow passages, and said mixture valve in said mixture connection, responsive to said engine crank angle and cycle sensor, and operative upon said valve drivers, so that:

each of said exit flow passages is open during at least a portion of said combustion time interval, for at least one engine operating condition;

throughout said combustion time interval at least one of said exit flow passages is open;

said mixture valve is open during a portion of said exhaust, intake, and compression time intervals, and is closed during said combustion and expansion time intervals.

15. In an internal combustion engine as described in claim 14, and further comprising:

at least one set of spark electrodes located at the combustion chamber end of said variable volume chamber, and positioned where air fuel mixture, displaced out of said displacer volume, mixes with the gases contained within said variable volume chamber;

a spark energizer and timer means for creating electric sparks at said sets of spark electrodes, said sparks being timed, relative to said variable volume cycle, to occur during said combustion time interval.

16. In an internal combustion engine as described in claim 15:

wherein said displacer piston driver means, said driver timer means, said displacer piston reactor means, and said retractor timer means, comprise a mechanical driver, retractor, and timer means, driven directly from said drive means for driving said internal combustion engine mechanism so that:

said displacer piston moves into said displacer volume during said combustion time interval;

said displacer piston is held within said displacer volume throughout said expansion time interval;

said displacer piston is retracted out of said displacer volume during a portion of said exhaust, intake, and compression time intervals.

* * * * *